United States Patent [19]
Lähteenmäki

[11] Patent Number: 5,560,114
[45] Date of Patent: Oct. 1, 1996

[54] ARRANGEMENT FOR COMPENSATING FOR MAGNETIC DECLINATION IN AN OPTICALLY READABLE BEARING COMPASS

[75] Inventor: Ari Lähteenmäki, Helsinki, Finland

[73] Assignee: Suunto Oy, Espoo, Finland

[21] Appl. No.: 459,109

[22] Filed: Jun. 2, 1995

[30] Foreign Application Priority Data

Jun. 22, 1994 [FI] Finland ................................. 943008

[51] Int. Cl.⁶ ............................................ G01C 17/02
[52] U.S. Cl. ............................................ 33/356; 33/272
[58] Field of Search ...................... 33/355 R, 15 B, 33/15 D, 354, 356, 357, 358, 359, 272, 275 R

[56] References Cited

U.S. PATENT DOCUMENTS

| | | | |
|---|---|---|---|
| 2,296,285 | 9/1942 | Lear | 33/356 |
| 3,813,792 | 6/1974 | Jarvenpaa | 33/356 |
| 4,531,298 | 7/1985 | West, Jr. | 33/301 |
| 4,920,656 | 5/1990 | Cross | 33/355 R |
| 5,060,390 | 10/1991 | Hill | 33/1 SD |

FOREIGN PATENT DOCUMENTS

| | | | |
|---|---|---|---|
| 910595 | 5/1954 | Germany | 33/272 |
| 2156404 | 7/1972 | Germany. | |
| 2313521 | 10/1974 | Germany. | |
| 2095406 | 9/1982 | United Kingdom. | |

Primary Examiner—Christopher W. Fulton
Attorney, Agent, or Firm—Steinberg, Raskin & Davidson P.C.

[57] ABSTRACT

An arrangement for correcting declination in an optically readable bearing compass having a body enclosing a hermetically sealed capsule containing a compass card and a main reading line calibrated indicate bearing to the earth's magnetic pole without correction of declination. The compass body further includes an opening or passage having an optical system therein suited to facilitate taking the bearing indicated by the wind rose. The compass has a movable auxiliary reading line which is adjustable with respect to the compass body and the main reading line to both sides from its center position corresponding to the zero value of declination thus permitting the correction of bearing error caused by the geographic displacement between the true North Pole and the magnetic north pole.

12 Claims, 3 Drawing Sheets

ARRANGEMENT FOR COMPENSATING FOR MAGNETIC DECLINATION IN AN OPTICALLY READABLE BEARING COMPASS

BACKGROUND OF THE INVENTION

The present invention relates to an arrangement for correcting or compensating for magnetic declination in an optically readable bearing compass whose body encloses a hermetically sealed capsule containing a wind rose compass card and is provided with a main reading line calibrated to indicate bearing to the earth's magnetic pole without correction of declination. The body of the bearing compass has an opening equipped with an optical system suited to facilitate taking the bearing indicated by the compass card.

In a customary construction of conventional bearing compass, the compass is equipped with a compass card, e.g., a wind-rose-type compass card, and one reading point or reading line visible through the optics of the compass. Correction of declination, also called variation, cannot be arranged in this type of compass. In this note, the term "variation" generally connotes the deviation of the magnetic needle of the indicator from the true north direction which varies from place to place and is determined by the direction of the horizontal component of the earth's magnetic field which is called declination.

Correction of declination is extremely important as the difference in degrees on a 0–360° scale between the bearing to the magnetic north pole and the bearing to the geographic north pole, or true North Pole in many areas of the earth may amount up to about 30° and above. Due to declination, maps are printed marked with the local values of declination. As an example it may be mentioned that, depending on the area, declination in the North-American continent varies from 35° eastern declination to 40° western declination.

In conventional bearing compass constructions with a wind rose, the correction for declination in order to obtain the true bearing has usually been possible only by first reading the normal magnetic bearing and then either adding or subtracting thereof the local value of declination taken from the map, depending on whether the declination is eastern or western declination. Hence, the acquisition of true bearing has always necessitated calculation with basically simple rules, which in some cases are even misinterpreted so that the value of declination has been added to the bearing reading while it should have been subtracted. Thus, a double error has been introduced into the bearing measurement.

OBJECTS AND SUMMARY OF THE INVENTION

It is an object of the present invention to achieve an entirely novel compass arrangement which is capable of overcoming the shortcomings of the conventional prior art bearing measurement techniques described above.

It is another object of the present invention to provide a new and improved compass arrangement which offers improved and easier use thereof.

To achieve these objects and others, the compass arrangement in accordance with the invention includes a movable auxiliary reading line which is adjustable with respect to the compass body and the main reading line to both sides from its center position corresponding to the zero value of declination thus permitting the correction of bearing error caused by the geographic displacement between the true North Pole and the magnetic north pole.

The invention provides several essential benefits over prior art techniques including, inter alia, the following advantages. With the arrangement according to the invention, the correct bearing reading with respect to the true North Pole can be obtained from the compass directly without calculations. This improvement is attained by virtue of a constructional property according to the invention which makes it possible to precompensate for the declination by adjusting the reading line of the compass as required to compensate for the local value of declination. As a compass is mostly used over a particular area, the compasses sold for use over such a known area can be precompensated by the vendor for correct bearing thus relieving the user from the need for adjusting the compass at all. However, when the compass is moved away from the area for which the reading line of compass is deflection-adjusted, the compass can be easily readjusted for the declination of the new operating area.

In a most basic embodiment, the arrangement for compensating for magnetic declination in an optically readable bearing compass, comprises a body, a hermetically sealed capsule enclosed within the body, a compass card having bearing markings being situated within the capsule, and viewing means arranged in the body for viewing the capsule from outside the body. A main reading line arranged in the body is viewable through the viewing means whereby the main reading line coincides with the bearing relative to the earth's magnetic north pole without correction of declination. In accordance with the invention, a movable auxiliary reading line arranged in the body and the body includes means for adjusting the auxiliary reading line with respect to the body and the main reading line to a position corresponding to a zero value of declination to enable correction of bearing error caused by geographic displacement between the true North Pole and the magnetic north pole. The capsule may be rotatingly mounted in the body whereby the auxiliary reading line is fixed to the capsule such that the adjusting means offset the auxiliary reading line by a desired number of degrees through rotation of the capsule. Alternatively, the capsule and the main reading line may be fixed to the compass body whereby the adjusting means adjust the auxiliary reading line with respect to the capsule to a position corresponding to a zero value of declination to enable correction of bearing error caused by geographic displacement between the true North Pole and the magnetic north pole such that upon coincidence of the auxiliary reading line and the main reading line, the main reading line corresponds to the true north pole. In this case, the auxiliary reading line may be arranged on an outer surface of the capsule or in an interior of said capsule. In another embodiment, the capsule is fixed to the body and the main reading line is fixed to the capsule. The adjusting means offset the auxiliary reading line with respect to the capsule to a position corresponding to a zero value of declination to enable correction of bearing error caused by geographic displacement between the true North Pole and the magnetic north pole such that upon coincidence of the auxiliary reading line and the main reading line, the main reading line corresponds to the true north pole.

Other benefits and characteristics of the invention will be evident from the detailed description of the invention given below in a nonlimiting manner to the scope and spirit of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE DRAWINGS

Figure 1:
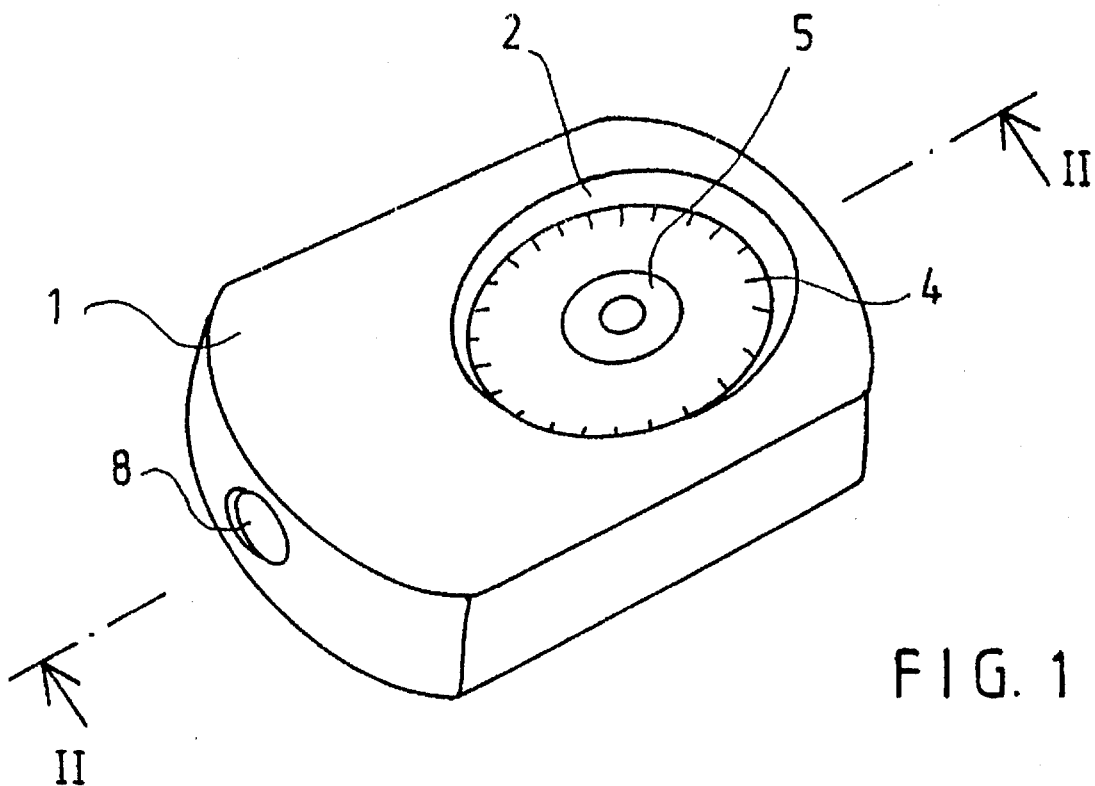
FIG. 1 is a schematic perspective view of an embodiment of a compass suited to implement the arrangement according to the invention.
Figure 2:
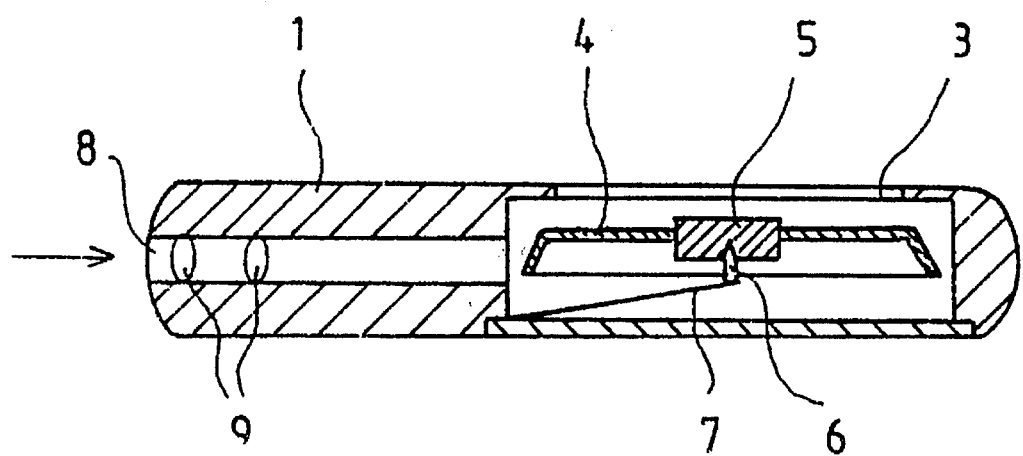
FIG. 2 is a schematic view of the construction of the compass shown in FIG. 1 sectioned along the line II—II of the diagram of FIG. 1.

With reference to the accompanying drawings wherein the same reference numerals refer to the same or similar elements, a bearing compass and parts of the bearing compass are shown with the compass body denoted by reference numeral 1. To render the compass durable in use, the compass body 1 is advantageously made of, e.g., lightweight alloy or high-strength plastic material. In the embodiment shown in the diagrams, the compass body 1 is provided with a bowl cavity 2 into which a liquid-filled and entirely hermetically sealed capsule 3 is placed. Capsule 3 houses a compass card 4, e.g., a wind rose compass card. The compass card 4 is equipped in a conventional manner with a graduation scale and directional indications and is mounted at its pivot point 5 rotatingly by means of a jewel cap made from, e.g., a sapphire, onto a tipped support pin 6 made from an extremely durable material such as a hard metal alloy or similar material (FIG. 2). The support pin 6 is attached via a flexible support member 7 to the capsule 3. By virtue of the damping liquid in the capsule and the pivotal bearing, the compass card 4 can move smoothly and without jitter to provide a directional indication.

Figure 3:
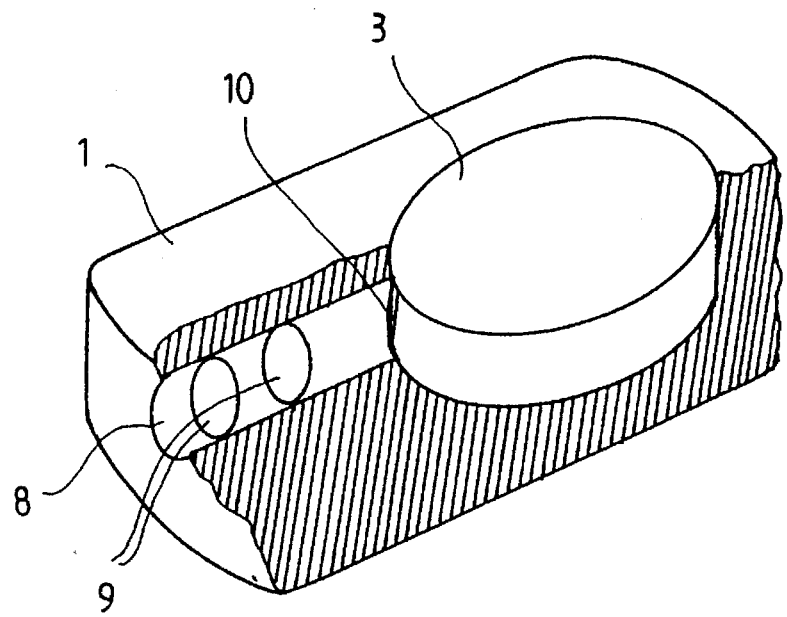
FIG. 3 is a further detailed partially sectional view of the construction of the compass shown in FIG. 1.

Viewing means such as a hollow opening or passage 8 is formed in the compass body 1 and extends from the outer surface of the body 1 to the inside of the cavity 2. The opening is provided with an optical system 9 comprising at least one lens through which the bearing reading of the compass card is taken. As shown in FIG. 3, a reading line 10 is marked at the end of the opening 8 abutting the capsule 3 whereby when the graduation marking of the compass card 4 coincides with the reading line indicates the bearing. If the reading line 10 were directly made on the capsule 3 and the capsule 3 were permanently mounted to the compass body 1, correction of deviation would not be possible in such a construction without resorting to calculations. Hence, the following text describes two alternative exemplifying embodiments suited to implement correction of deviation by virtue of the arrangement according to the present invention.

Figure 4:
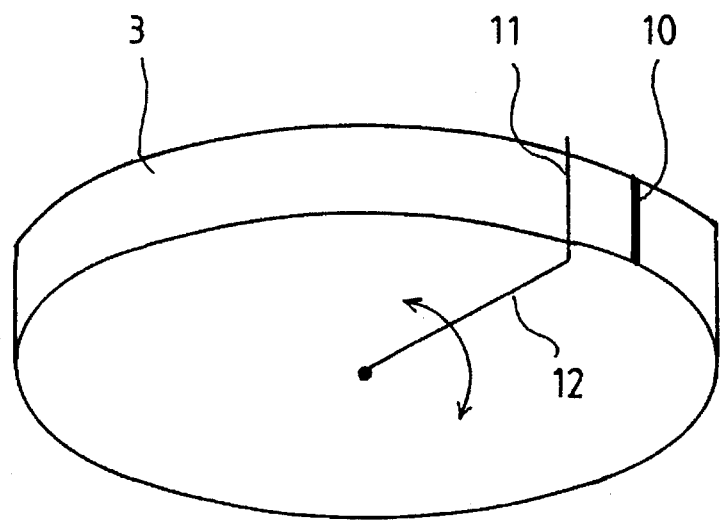
FIG. 4 is a schematic perspective view of an alternative embodiment of the declination-correcting arrangement in accordance with the invention adapted to a compass capsule.
Figure 6:
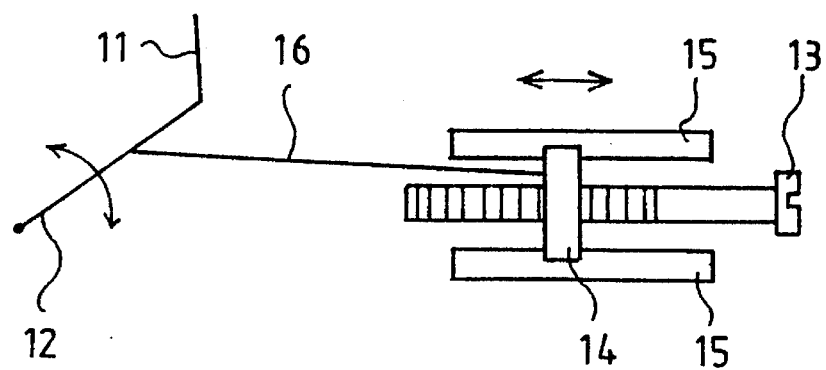
FIG. 6 is a schematic view of a still another embodiment of the declination-correcting mechanism in accordance with the invention.

In a first embodiment of the invention illustrated in FIGS. 4 and 6, the capsule 3 is mounted permanently to the compass body 1, e.g., as shown in FIGS. 2 and 3, so that the reading line 10 is at the optical system 9 in the center of the opening 8. In this embodiment, the reading line 10 is a so-called main reading line 10 which due to the mounting method of the capsule 3 is stationary with respect to the compass body 1. In addition to this reading line 10, the compass body 1 is provided with a movable auxiliary reading line 11 which is by means of, e.g., a support element 12 adapted to be movable with respect to the compass body so that the auxiliary reading line 11 can be moved by a desired number of degrees, e.g., from about 25° to about 30° to both sides from the center position 8 of the opening, that is, offset from the main reading line 10. Thus, the auxiliary reading line 11 may be offset-rotated from alignment with the main reading line 10 aside by the number of degrees required by the local deviation, whereby the correct bearing relative to the true north can be taken directly under the auxiliary reading line 11.

The movement of the auxiliary reading line 11 can be implemented in a number of different ways, and the exemplifying embodiment shown in FIG. 6 is just one alternative to achieve such a movement. The embodiment illustrated in FIG. 6 has the compass body 1 (not shown in this diagram) equipped with guides 15 along which a slide 14 is adapted to move. The slide 14 is moved along the guides 15 by means of a screw 13, i.e., the rotation thereof, and a lever 16 is connected at one end to the slide and at an opposite end is pivotally connected to the support element 12 of the auxiliary reading line 11. Thus, rotation of the screw 13 makes it possible to adjust the auxiliary reading line 11 exactly to a desired offset position. The screw movement illustrated herein can be replaced in a number of alternative arrangements such as a toothed gear or similar means. Furthermore, the movable auxiliary reading line 11 can be arranged in an interior of the capsule 3 where it is supported in a jitter-free manner by the damping liquid. However, in such an arrangement the auxiliary reading line is more difficult to arrange offset-adjustable. Also, the movable auxiliary reading line 11 can be arranged on an outer surface of the body.

Figure 5:
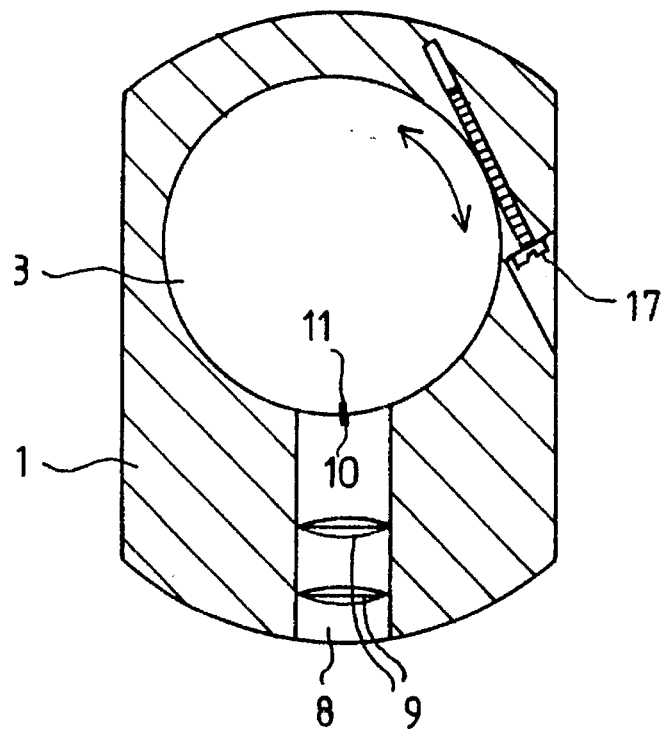
FIG. 5 is a schematic sectional top view of another alternative embodiment of the declination-correcting arrangement adapted to a bearing compass in accordance with the invention.

With reference to FIG. 5, an alternative method of implementing the arrangement according to the invention is shown. In the embodiment illustrated in FIG. 5, the capsule 3 is provided as above with an adjustable reading line, which in this embodiment can be the auxiliary reading line 11 which is fixed to the capsule 3. Differing from the first embodiment above, the capsule 3 is not mounted permanently to the compass capsule 1 but rather is rotatingly mounted in the cavity 2 of the body 1. Using suitable means, the main reading line 10 is mounted stationary with respect to the compass body 1. The compass body 1 further incorporates an adjustment element 17 capable of rotating the capsule 3, and therewith, also the auxiliary reading line 11 with respect to the body 1 by a desired number of degrees, e.g., from about 25° to about 30° to both sides from the center position shown in FIG. 5. While the adjustment element shown in FIG. 5 is an adjustment screw 17 which cooperates with a similarly formed outer surface of the capsule 3, any other adjustment means can be employed such as a toothed gear or similar means.

The adjustment of the auxiliary reading line 11 for correction of declination can be made in two alternative ways. The first and more accurate method comprises first taking bearing to any entirely random object using the main reading line 10 and then offset-adjusting the auxiliary reading line 11 by the number of degrees corresponding to the local declination in the direction required to correctly make the correction of declination. Thereafter, the compass can be used by taking bearing under the auxiliary reading line 11 The other, "coarser" method comprises looking at the graduation of the compass card 4 via the optical system 9 without taking bearing by sighting the compass on any particular object. Next, the auxiliary reading line 11 is offset-adjusted by half the number of degrees required to correctly make the correction of declination. Then, taking bearings by means of the auxiliary reading line 11 gives the correct bearing, because when the compass is sighted on the desired object with the help of the auxiliary reading line 11 which is offset by half the number of degrees of the local declination from the main reading line 10, the compass must correspondingly be rotated by another half the local declination, whereby the full correction of declination is achieved by the combination of the offset of the auxiliary reading line 11 and the rotation of the compass.

The examples provided above are not meant to be exclusive. Many other variations of the present invention would be obvious to those skilled in the art, and are contemplated to be within the scope of the appended claims.

I claim:

1. An arrangement for compensating for magnetic declination in an optically readable bearing compass, comprising a body, a hermetically sealed capsule enclosed within said body, said capsule containing a compass card having bearing markings, viewing means arranged in said body for viewing said capsule from outside said body, a main reading line arranged in said body and viewable through said viewing means, said main reading line coinciding with the bearing relative to the earth's magnetic north pole without correction of declination, a movable auxiliary reading line arranged in said body, and means for adjusting said auxiliary reading line with respect to said body and said main reading line to a position corresponding to a zero value of declination to enable correction of bearing error caused by geographic displacement between the true North Pole and the magnetic north pole.

2. The arrangement of claim 1, wherein said capsule is rotatingly mounted in said body, said auxiliary reading line being fixed to said capsule such that said adjusting means offset said auxiliary reading line by a desired number of degrees through rotation of said capsule.

3. The arrangement of claim 2, wherein said adjusting means comprise an adjustment element for rotating said capsule and thus said auxiliary reading line fixed thereto with respect to said body.

4. The arrangement of claim 3, wherein said adjustment element comprises an adjustment screw.

5. The arrangement of claim 1, wherein said capsule and said main reading line are fixed to said compass body, said adjusting means adjusting said auxiliary reading line with respect to said capsule to a position corresponding to a zero value of declination to enable correction of bearing error caused by geographic displacement between the true North Pole and the magnetic north pole such that upon coincidence of said auxiliary reading line and said main reading line, said main reading line corresponds to the true north pole.

6. The arrangement of claim 5, wherein said auxiliary reading line is arranged on an outer surface of said capsule.

7. The arrangement of claim 5, wherein said adjusting means comprise an adjustment screw.

8. The arrangement of claim 5, wherein said auxiliary reading line is arranged in an interior of said capsule.

9. The arrangement of claim 1, wherein said capsule is fixed to said body and said main reading line is fixed to said capsule, said adjusting means adjusting said auxiliary reading line with respect to said capsule to a position corresponding to a zero value of declination to enable correction of bearing error caused by geographic displacement between the true North Pole and the magnetic north pole such that upon coincidence of said auxiliary reading line and said main reading line, said main reading line corresponds to the true north pole.

10. The arrangement of claim 1, wherein said adjusting means comprise a rotatable screw, a slide engaging with said screw and being movable upon rotation of said screw, guides for guiding movement of said slide, a lever connected to said slide, and a support element connected to said lever and to said auxiliary reading line such that the movement of said slide causes movement of said lever and said support element and thus said auxiliary reading line.

11. The arrangement of claim 1, wherein said viewing means comprise a passage extending from an edge of said body to said capsule.

12. The arrangement of claim 1, wherein said compass card is movably fixed within said capsule.

* * * * *